Oct. 7, 1969     L. H. McROSKEY ET AL     3,471,690
RACE TRACK CONTROL MEANS FOR AMUSEMENT DEVICES
Filed March 6, 1967
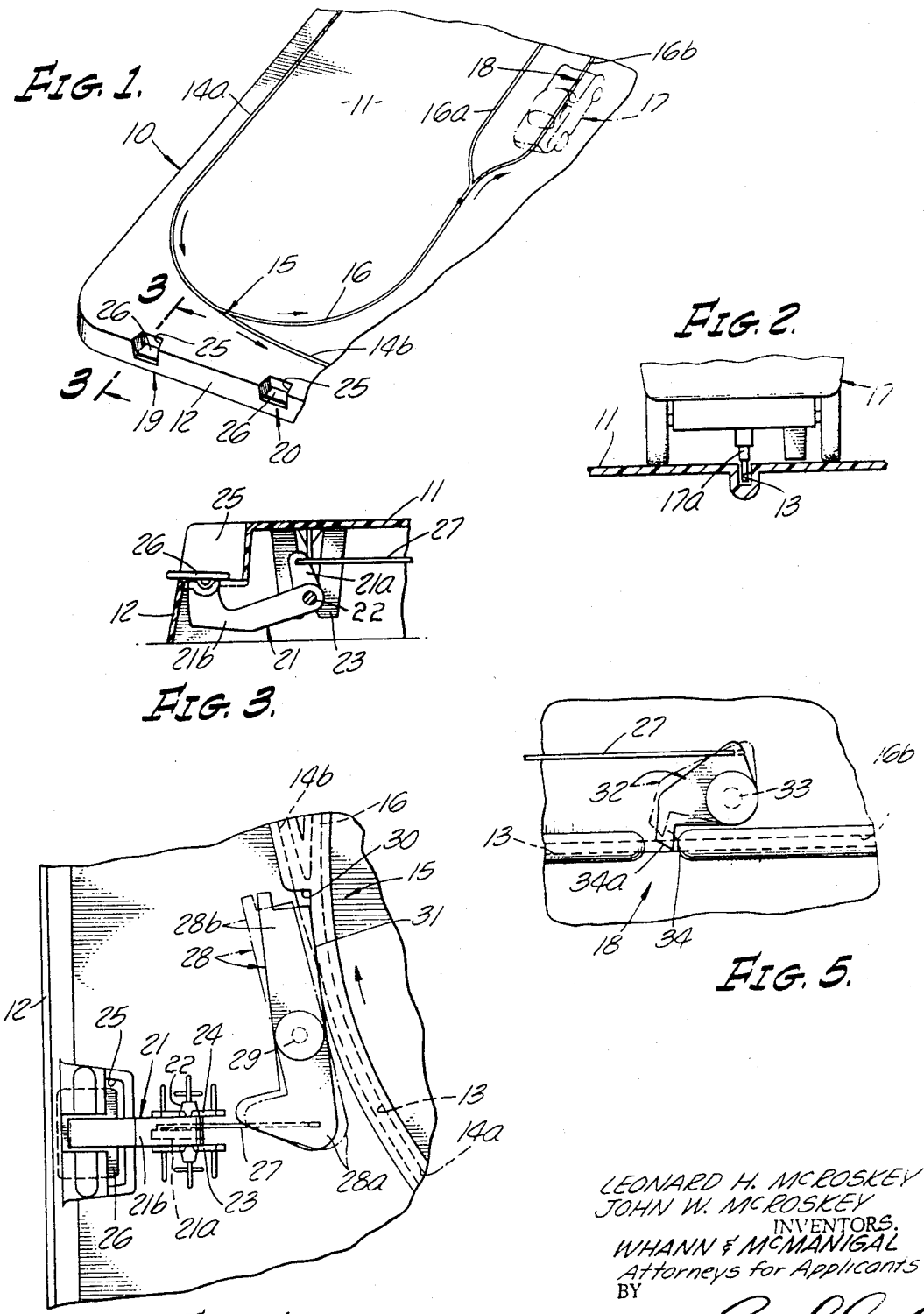
LEONARD H. McROSKEY
JOHN W. McROSKEY
    INVENTORS.
WHANN & McMANIGAL
Attorneys for Applicants
BY

United States Patent Office 3,471,690
Patented Oct. 7, 1969

3,471,690
RACE TRACK CONTROL MEANS FOR AMUSEMENT DEVICES
Leonard H. McRoskey and John W. McRoskey, Los Angeles, Calif., assignors to Republic Tool & Manufacturing Corp., a corporation of California
Filed Mar. 6, 1967, Ser. No. 620,964
Int. Cl. E01b 7/00
U.S. Cl. 246—415     2 Claims

ABSTRACT OF THE DISCLOSURE

Track switching and gating devices for controlling movement of a miniature vehicle on a race track course in which a track switching member or gate member is pivotally mounted so as to be cammed or deflected, upon being engaged by a part of the moving vehicle, to a noneffective switching position in the case of a track switch, and to an open gate position in the case of the gating device. A remote actuator lever is respectively operable in each case, through a linkage connection with the track switching member or the gate member, to manually oppose the camming action and hold the switching member in its effective switching position or the gate member in a gate closed position, until the actuator is released. Biasing springs are thus eliminated.

BACKGROUND OF THE INVENTION

The present invention relates to the art of switching and gating the movements of a propelled vehicle or other object with respect to a guide track.

Heretofore, it has been conventional practice in amusement devices, of the type wherein vehicles and various other objects are propelled on a guide track or race course, to provide track switches and stop gates which are normally spring urged towards their non-effective positions. To actuate these switches and gates to their effective positions, it has been the conventional practice to provide manually operable means for moving the track switch or gate to its effective position, against the opposing force of the associated springs. Such springs add materially to the cost of producing and assembling the devices.

In the present invention, the springs have been eliminated and the track control means such as the switching element, the gate element and the like are made of a lightweight material and mounted so that under normal conditions they will be pushed aside by a camming action when engaged by the moving vehicle or other object. By means of a connected digital actuator the track control element may be held against movement as a result of the inertia of the vehicle or other object and thus function to perform its intended switching, gating or other intended function.

SUMMARY OF THE INVENTION

The present invention relates generally to mechanism for selectively controlling the movement of vehicles and other propelled objects over a guiding track or race course such as found in amusement and game devices, and is more particularly concerned with track switching and gating devices, and manually operable means for their control.

It is one object of the present invention to provide an improved mechanism for controlling vehicles or other propelled objects on a guide track or race course, which is simple of construction, economical to produce, and effective as to its required functions.

A further object is to provide in track switching and gating devices a remotely controllable lightweight member at a track station, which will be moved by a camming action, upon engagement by an object moving on the track, to a noneffective position, but which may be opposed in such movement by manually manipulated actuator means at a remote control station, when desired.

Another object is to provide mechanism of the character described which is devoid of springs.

Further objects of the invention will be brought out in the following part of the specification, wherein detailed description is for the purpose of fully disclosing the invention without placing limitations thereon.

BRIEF DESCRIPTION OF THE DRAWINGS

Referring to the accompanying drawings, which are for illustrative purposes only:

FIG. 1 is a fragmentary perspective view of a race track containing surface of an amusement device having track controlling mechanisms embodying the features of the present invention applied thereto;

FIG. 2 is a fragmentary transverse sectional view through a track portion, and diagrammatically illustrating the cooperaative relationship of a vehicle and the track guiding means;

FIG. 3 is an enlarged fragmentary sectional view, taken substantially on line 3—3 of FIG. 1 to show constructional features of a remote actuator device;

FIG. 4 is a fragmentary bottom plan view showing the interconnection of an actuator of FIG. 3 with a track switching device; and FIG. 5 is a similar view showing the details of a gating device as operable by an actuator such as shown in FIG. 3.

DESCRIPTION OF THE PREFERRED EMBODIMENT

Referring more particularly to the drawings, for illustrative purposes, there is shown in FIG. 1 a fragmentary portion of a game board 10. This game board may be constructed of any suitable material such as a molded plastic or other material to provide a structure having a flat upper surface 11 and a peripheral downwardly turned edge flange 12.

The surface 11 is formed on a wall structure in which there is formed a race track course by molding therein a guiding groove 13, as shown in FIG. 2.

In general, the race course or track may embody a variety of configurations. For purposes of illustration, however, the track has been shown as including main track sections 14a and 14b.

At a switch point 15, the main track connects with a branch track section 16 leading into parallel track sections 16a and 16b such as might be utilized to provide passing tracks, sidings and the like.

A small vehicle is shown as comprising a miniature racing automobile which has been indicated in phantom lines and identified by the numeral 17. The vehicle is shown at a gate position 18 on the passing track section 16b. While the vehicle has been disclosed as a miniature racing automobile, it is within the broad concepts of this invention that the vehicle might comprise other embodiments. The vehicle is preferably self-propelled and carries its own motive power which may comprise an electric battery for energizing a driving electric motor connected to the vehicle drive wheel. The vehicle is thus driven over the track course, and is guided thereon by a guide pin 17a, as shown in FIG. 2, which has its lowermost end portion positioned in the track groove 13.

At one end of the game board, there are provided controllers which may be manually actuated to control track switching mechanism at the switch point 15 and gating mechanism at the gate position 18 to vary the operation of the vehicle on the track. The actuators are similarly constructed and are indicated by the numerals 19 and 20. Since each actuator is of the same construction, it will be necessary to describe only one of the actuators.

As shown in FIG. 3, each actuator comprises an angle lever 21 which is swingably mounted upon a horizontal pivot 22 that is supported by end bearing brackets 23 and 24. As thus mounted, one leg 21a of the lever extends substantially vertically, while the other leg 21b extends generally in a horizontal direction and normally tends to rotate the lever counterclockwise under the force of gravity. This leg is angularly deflected at its outer end to extend into a recess 25 and provide a support for a finger engageable button 26 carried thereby. The vertical leg is connected with a motion transmitting link 27.

Actuator 19 is connected to a track switching mechanism at switch point 15. As shown in FIG. 4, the switching mechanism at switch point 15 comprises a track switching member 28 which is swingably mounted on a vertical pivot 29. An end 28a of the switching member is connected to the motion transmitting link 27, while the opposite end 28b is arranged to swing edgewise into and out of a track opening 30. This end of the switching member is shown in full lines in its effective position in the slot 30. In this position, a vehicle approaching switch point 15 on track section 14a will engage its pin 17a against an edge 31 of the switching member, which thus results in a camming action that forces the switching member to swing to its phantom line position and permit the vehicle to continue straight through the switching point and onto track section 14b. However, when it is desired that the vehicle be switched from track section 14a to track section 16, this is readily accomplished by manually holding the button 50 of the actuator 19 in its lower or depressed position. The switching member 28 will then be held in its full line or effective position where it will function to switch the vehicle onto the branch track section 16.

Actuator 20 is connected with the track gate mechanism at the gate position 18. The gate mechanism, as shown in FIG. 5, comprises a gating member 32 in the form of a plate which is supported for swinging movement on a vertical pivot 33. This plate carries a finger projection 34 which is arranged to occupy an effective or gate closed position as shown in full lines or a non-effective or gate open position as shown in phantom lines. The outer end of the projection 34 is bevelled to provide a camming edge 34a which extends across the slot 13 when the gating member is in a gate closed position. Normally, in the gate closed position, the pin 17a of an approaching vehicle will engage the camming edge and move the gate member to its gate open position. The vehicle thus proceeds along the track past the gate position. However, when it is desired to stop or hold the vehicle at the stop position this is readily accomplished by holding the finger engaging button in a depressed or down position. This action opposes movement of the gating member to its released or gate open position. Upon releasing the button, however, the propelling force of the vehicle will act through the pin 17a to cam the gating member to an open position and permit passage of the vehicle.

From the foregoing description and drawings, it will be clearly evident that the delineated objects of the invention will be accomplished.

Various modifications may suggest themselves to those skilled in the art without departing from the spirit of our invention, and, hence, we do not wish to be restricted to the specific form shown or uses mentioned.

We claim:

1. Control means for a guide track having an object propelled thereon, comprising:
   (a) a member at a track station supported for pivotal movement into effective and noneffective control positions, said member in its effective position being in the path of guided movement of an object along the track, and upon engagement by the moving object being cam actuated to its non-effective position; and
   (b) remote actuator means including an angle lever pivoted for movement about a horizontal pivot and having one leg connected through a motion transmitting link with said member so that in the effective position of said member, the other leg of said lever lies in a depressed position, said actuator means being operable to hold said member in its effective position and to oppose movement to its non-effective position by manually holding said other leg in said depressed position.

2. Control means according to claim 1, wherein said member and said angle lever are supported on pivots having their axes in right angled relation.

References Cited

UNITED STATES PATENTS

| 3,206,122 | 9/1965 | Frisbie et al. | |
| 3,290,498 | 12/1966 | Lahr | 104—60 |
| 3,316,401 | 4/1967 | Cramer. | |
| 3,339,923 | 9/1967 | Nadolny | 104—60 |
| 3,377,958 | 4/1968 | Bax et al. | 246—415 |

DRAYTON E. HOFFMAN, Primary Examiner

R. A. BERTSCH, Assistant Examiner